Patented Aug. 17, 1937

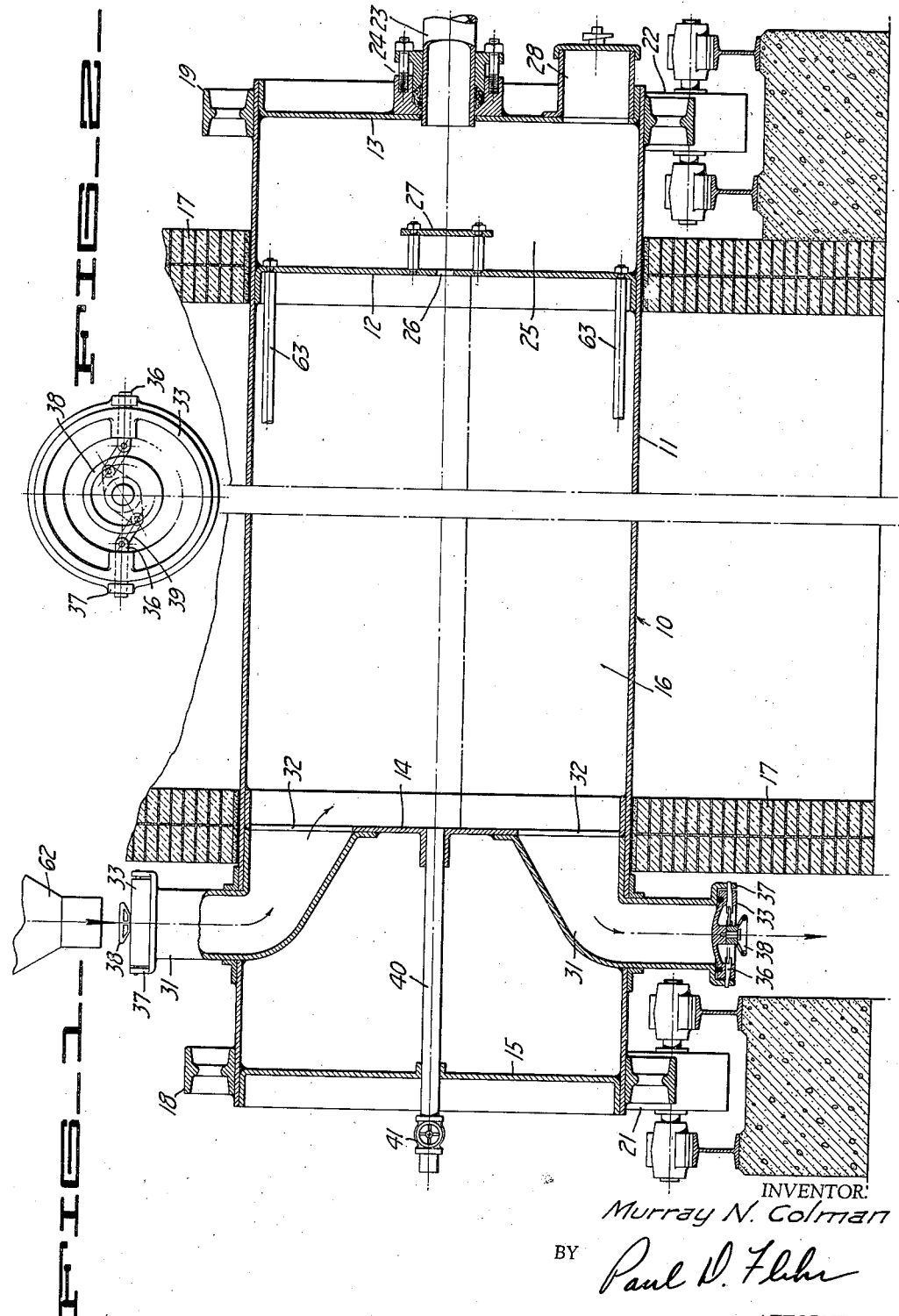

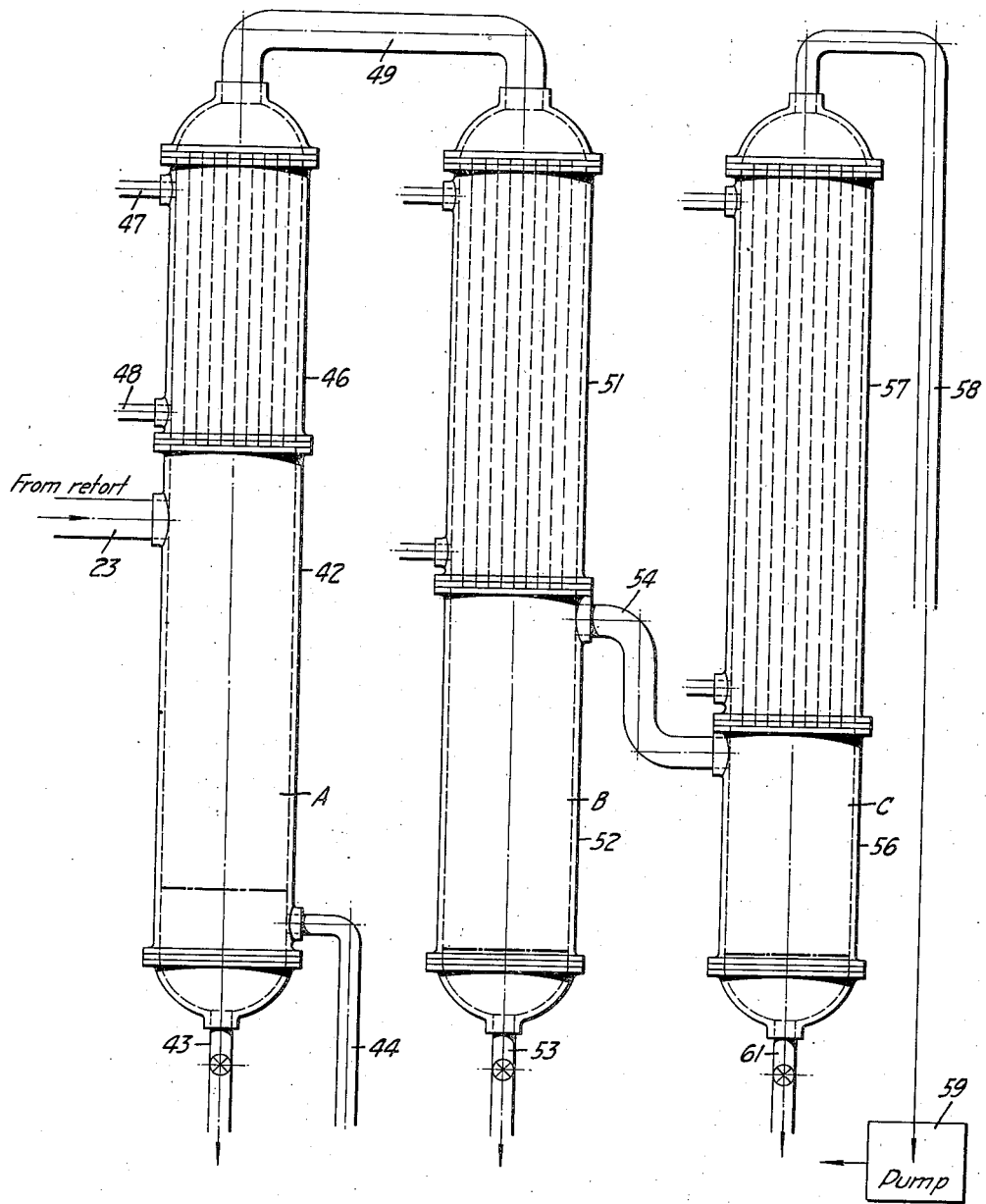

2,090,472

UNITED STATES PATENT OFFICE 2,090,472

PROCESS FOR THE RECOVERY OF MERCURY FROM ORE

Murray N. Colman, Los Altos, Calif.

Application May 8, 1934, Serial No. 724,533

2 Claims. (Cl. 75—81)

This invention relates generally to processes for the heat treatment of certain natural ores, like cinnabar, to effect recovery of mercury therefrom.

In the past it has been common to heat cinnabar to an elevated temperature to effect decomposition of the same and to release mercury vapor. This procedure is commonly carried out by the use of stationary metal retorts, which are charged with a batch of ore to be treated, and which are connected to a mercury vapor condenser. Upon heating the retort to an elevated temperature, mercury vapor is evolved with sufficient pressure to discharge the vapor and other volatilized products to the condenser. Such processes and apparatus have been relatively inefficient, both with respect to economy of operation and with respect to the percentage of recovery afforded. For example, the heat is not uniformly distributed throughout the charge of ore, which, together with the fact that the mercury vapor being evolved is at a pressure somewhat greater than atmospheric, results in an undue time period for completion of the retorting cycle, and in incomplete decomposition of the mercury compounds. Frequently, further loss of mercury is caused by the use of an inadequate condensing system which discharges gas into the atmosphere at a relatively high velocity, and by contamination of the evolved volatilized products with free sulphur.

It is an object of the present invention to provide a process and apparatus of the above character which will be relatively efficient, both with respect to the time period for a cycle of operation and utilization of heat, and with respect to the recovery of mercury afforded and the elimination of so-called "soot".

A further object of the invention is to provide a process and apparatus of the above character which will avoid contamination of the evolved volatilized products with free sulphur, and which will avoid a high velocity discharge of gas from the condensing system with resulting loss of values.

Another object of the invention is to provide a novel form of retort characterized by the fact that it is continuously rotated during a retorting cycle, while its interior is subjected to a partial vacuum for removal of evolved volatilized products. My novel retort is further characterized by the use of dust separating means, whereby the removed products which are delivered to the condensing system are relatively free of dust.

Further objects of the invention will appear from the following description in which the preferred embodiment of the invention has been set forth in detail in conjunction with the accompanying drawings.

Referring to the drawings:

Fig. 1 is a side elevational view, in cross-section, illustrating a retort incorporating the present invention.

Fig. 2 is a detail illustrating one form of quickly removable closure which can be utilized in conjunction with the retort of Fig. 1.

Fig. 3 is a side elevational view of a suitable condensing apparatus or system, for use with the retort of Fig. 1.

The method or process of the invention can be best understood after an explanation of the apparatus illustrated in the drawings. Thus, referring to Figs. 1 and 2, there is shown a retort 10 formed with a cylindrical metal shell 11. One end of this shell is closed by the spaced end walls 12 and 13, while the other end is closed by the spaced walls 14 and 15. The space 16 between the walls 12 and 14 forms a chamber for receiving the charge of ore to be treated. The intermediate part of the retort is enclosed by the walls 17 of a suitable furnace. In order to support the retort so that it can be rotated about a horizontal axis, its end portions are shown provided with track rings 18 and 19, which serve to engage rollers 21 and 22. These rollers are supported by suitable journals, and at least one of them is driven by suitable means, such as an electric motor.

In order to remove volatilized products from the retorting chamber 16, a conduit 23 extends centrally through the end wall 13, there being a suitable gland or stuffing box 24 to minimize leakage. The end space 25 between walls 12 and 13 is in communication with retorting chamber 16, through the central port or orifice 26. A baffle plate 27 is supported directly in front of the orifice 26, in order to prevent direct jetting of volatilized products into the conduit 23. It may be explained at this point that the space 25, in conjunction with the baffle plate 27, serves as a dust separator and collector, to prevent carrying-over of dust through conduit 23. Accumulated dust can occasionally be removed through the normally sealed conduit 28.

The other end of the retort is preferably provided with means for facilitating introduction of a charge of ore into the chamber 16, and for effecting removal of a spent charge after a retorting operation. Thus, a pair of conduits 31 have their inner ends communicating through openings 32 in the end wall 14, and their outer ends extending beyond the periphery of the shell 11 where they are provided with readily removable covers 33. These covers should be capable of making a tight seal, aside from being readily removable to permit introduction or discharge of material. In the construction illustrated in Fig. 2, each cover is provided with slidable bolts 36 which are adapted to engage keepers 37. The cover also carries a rotatable hand wheel 38 which carries arms pivotally connected to bolts 36 by means of links 39.

As will be presently explained, it is desirable to introduce limited quantities of air into the interior of retorting chamber 16, during the retorting operation. For this purpose there is shown a pipe 40 extending through the walls 14 and 15 and communicating between the outer atmosphere and the interior of the retorting chamber. This pipe is shown supplied with an external valve 41, to regulate the amount of air admitted.

To afford occasional access to the interior of the chamber 16, for clean-out operations, suitable sealed man-holes may be provided, opening through walls 14 and 15.

In Fig. 3 there is shown a type of condensing apparatus such as can be connected to the conduit 23. This equipment in this instance consists of three units, A, B and C, which are serially connected. Unit A consists of a lower separating chamber 42 to which conduit 23 connects. The lower end of chamber 42 connects to a pipe 43 for drawing off mercury, and also communicates with the upper end of a pipe 44 constituting a barometric seal. The upper part of unit A consists of a heat exchanger 46, which can be of conventional construction, consisting for example of tubes surrounded by a jacket for the circulation of cooling water. Pipes 47 and 48 are indicated for the purpose of admitting and removing cooling water from the jacket. The upper end of the heat exchanger 46 connects with conduit 49, which in turn connects with the upper end of heat exchanger 51 for the unit B. The lower separating chamber 52 for unit B has a lower drain-pipe 53, and also communicates with a conduit 54 constituting a vapor connection between chamber 52 and chamber 56 for the unit C. The heat exchanger 57 for unit C is connected to the exhaust pipe 58, which in turn leads to the vacuum pump 59. Mercury can be drained from chamber 56 through the lower pipe 61.

Operation of the apparatus described above, in the carrying out of my process, can be briefly outlined as follows:—One of the closures 33 is removed and a charge of ore, such as cinnabar, is introduced into the retorting chamber. The charge can be supplied from suitable means, such as the feed hopper 62 shown in Fig. 1. A charge of proper proportions should bring the level of the charge to a point slightly below the horizontal axis of the retort, without, however, blocking the inner end of pipe 40 or port 26. The retort is then sealed, the furnace fired, and the retort put into continuous rotation. The speed of rotation should be such as to continually turn over the charge of ore, without, however, causing an undue amount of agitation. Slippage of the charge, without proper turning over, may be prevented by providing rods 63 extending near the inner side walls of the retorting chamber. Before the retort has been heated to a material degree, vacuum pump 59 is put into operation, to cause the retorting chamber to be placed under a partial vacuum. As the temperature of the retort and the charge of ore rises, certain volatilized products are evolved from the ore, the first products being mainly steam by virtue of the evaporation of free moisture or water of crystallization which may be present. Such steam is condensed by the heat exchangers and accumulates as water in the lower separators. With a further rise in temperature, dissociation of the ore commences, to effect the release of mercury vapor. The mercury vapor is likewise condensed by the heat exchangers and accumulates in the lower separating chambers 42, 52 and 56, from which it may be removed from time to time through pipes 43, 53 and 61. Since the interior of the retort is always under a partial vacuum, small amounts of air, as compared with the amount of volatile products being removed, are drawn into the retorting chamber through pipe 40. This air stream sweeps over the surface of the charge and causes a surface burning of evolved free sulphur, thus avoiding detrimental contamination of the evolved products drawn into the condensing apparatus. As the evolved volatilized products are withdrawn through conduit 23, they are relatively free of dust particles, by virtue of the separating action of baffle 27 in conjunction with the enlarged separating space 25. Dust accumulating in space 25 is still subjected to an elevated temperature, so that any mercury remaining in the same will be eventually volatilized.

When substantially all of the mercury has been evolved from the charge, further heating and rotation of the retort is discontinued. One of the covers 33 is removed, and then by further rotation of the retort substantially all of the spent ore is discharged.

There are certain features and characteristics of my process which may not be apparent from the above description. The maintenance of a partial vacuum within the retort chamber, which may range from say six to ten inches of mercury, makes it possible for the mercury vapors to be evolved at a relatively lower temperature as compared with retorting at atmospheric pressures or pressures somewhat above atmospheric. The use of a sealed rotary retort makes possible more efficient and more uniform application of heat throughout the charge of ore, and this feature, in conjunction with the use of a partial vacuum, materially decreases the amount of time required to complete a retorting operation, and makes for substantially complete recovery. Rapid removal of evolved vaporized mercury, together with the use of a partial vacuum, avoids premature condensing of the mercury within parts of the retort or connections thereto, so that the mercury is all condensed in the units A, B and C. Surface burning of sulphur, by virtue of admission of air through charge 40, supplies a certain amount of heat which like-wise tends to prevent premature condensing of mercury vapor, as well as to avoid contamination of the evolved gaseous products with free sulphur or possible recombining of mercury with sulphur. The fact that the stream of air admitted through pipe 40 sweeps over the surface of the charge localizes the burning of free sulphur, to prevent undue heating of the walls of the retort or burning through the continually moving charge of material.

It will be noted that the condensing apparatus is sufficiently adequate not only to condense the mercury vapor but also to condense water vapor or steam which is inevitably discharged. Thus, the velocity of flow through the vacuum pump 59 is kept within reasonable limits, whereby the pump 59 can maintain a vacuum within the limits desired, and whereby there is substantially no carry-over of mercury such as would cause a loss of recovery. It may be explained in this connection that where a condensing equipment is designed merely for the purpose of condensing mercury vapor, the large volume of steam and other gaseous products discharged will carry away a material quantity of mercury which would be recovered in my process.

I claim:

1. In a process of treating ores like cinnabar for recovery of mercury therefrom, characterized by the use of a rotary retort, heating the retort together with a charge of ore contained within the same to an elevated temperature, applying a partial vacuum to the retort to effect removal of volatilized products, and admitting a controlled amount of air into the interior of the retort to minimize contamination of the removed volatilized products with free sulphur.

2. In a process of treating ores like cinnabar for recovery of mercury, characterized by the use of a rotary retort, heating the retort together with a charge of ore contained within the same to an elevated temperature, applying a partial vacuum to the retort to effect removal of volatilized products, and admitting a controlled amount of air into the interior of the retort to minimize contamination of the removed volatilized products with free sulphur, the air being admitted as a stream directly over the surface of the ore being treated.

MURRAY N. COLMAN.